Figure 2:
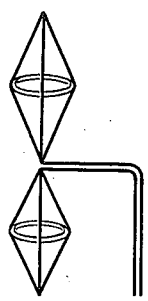

Dec. 30, 1941.      R. AUBERT      2,267,889

ANTENNA WITH WIDE WAVE RANGE

Filed March 23, 1939

INVENTOR
ROGER AUBERT
BY H. S. Snover
ATTORNEY

Patented Dec. 30, 1941

2,267,889

UNITED STATES PATENT OFFICE 2,267,889

ANTENNA WITH WIDE WAVE RANGE

Roger Aubert, Paris, France, assignor to Compagnie Generale de Telegraphie Sans Fil, a corporation of France Application March 23, 1939, Serial No. 263,644
In France March 23, 1938

5 Claims. (Cl. 250—33)

Where ultra-short waves are to be transmitted, say, waves of an order of 1 meter or less, it is often necessary to mount the antenna in a site that is perfectly free such as on top of a mast on ships or in the case of a ground installation on the top of the mast or of a high building.

For various reasons connected with convenience of operation it is generally impossible to dispose the rest of the transmitter equipment in the neighborhood of such an aerial. It is therefore customary in the majority of cases to use a feeder or an energy transmission line between the transmitter itself and the antenna, or between the antenna and the receiver apparatus. The length of such a feeder may vary between some tens of meters and several hundred meters.

For evident reasons of efficiency the impedances of the feeder and the antenna should be matched as perfectly as possible.

While this is accepted, the question is slightly complicated whenever the point is to transmit a very wide wave band, as is true, for instance, in television or of certain transmitters tuned to different frequencies.

In such a case it is necessary to make arrangements so that a matched condition with admissible values prevails throughout the band of frequencies to be transmitted.

This, in brief, is the problem which the invention is designed to solve. The optimal impedances of the feeders which are practically realizable are of an order of one hundred ohms in the case of concentric or co-axial feeders and an order of several hundred ohms in the case of symmetric bifilar feeders. These values are little variable inside the limits of frequency bands under consideration.

It has been ascertained that the impedance of filamentary antennae vibrating quarter-wave-fashion is subject to extreme variations with the frequency and may attain values widely varying from those above indicated, and this condition necessitates complicated matching arrangements that are both expensive and of poor efficiency.

Therefore, it is contemplated, in accordance with the present invention, to increase inside certain proportions, the diameter of the antenna to be used, and to cause the same to vibrate half-wave-fashion, while preserving the idea of unilateral feed, that is, excitation at one end thereof. Experiments made with this arrangement indicate the following advantages:

1. The use under conditions as stated of a vertical aerial of a real length close to one-half the mean wavelength of the wave-band to be used, makes it feasible to secure a radiation diagram in the vertical plane that is highly focused or concentrated in the directions near the horizontal. This increases the working range and diminishes fading and echo effects.

2. The impedance of such an aerial lies close to that of a concentric or co-axial feeder, and the task of matching a single one of these aerials to one of these feeders requires the adoption of only limited precautionary means or none at all.

3. The mechanical embodiment thereof is advantageous and results in assemblies of great ruggedness and strength and of great form stability.

4. Duplication of the antenna system in the form of a horizontal or vertical dipole results in an impedance, the matching of which to that of a symmetric bifilar feeder is also simple and advantageous.

5. In this latter instance, with each of the antenna elements, be it well understood, vibrating always half-wave, the assembly vibrates in full wave and the radiation diagram which is obtained for the said assembly presents very valuable directive properties: (a) for a vertical dipole the diagram is markedly compressed in the vertical plane towards the horizontal; (b) for a horizontal dipole very narrow beams result in the horizontal plane.

The present invention permits of obtaining an antenna of this nature for a wide frequency range extending practically from 1 to 1.6 or to 1.7 approximately.

The antenna may be a simple one or symmetrical to the feeder utilized.

The principle resides in obtaining an antenna whose transverse dimension is in the same order value as the longitudinal dimension.

In first approximation, the radiation resistance of such an antenna is substantially the same as that of a single wire antenna of the same length but its characteristic impedance is considerably diminished so that its over-voltage factor is itself very small.

The ensemble therefore forms a highly damped system and is therefore of slight sensitivity to frequency variations from the mid frequency of a wide band. It appears from theory and practice that for the entire frequency range, the reactive component of the impedance remains very low. The resistive component varies in accordance with the frequency but its variations are sufficiently reduced to permit a correct matching with a feeder.

The solution is thus only approached, but it is sufficient for practical requirements.

With elements having a length in the neighborhood of the medium half-wave, the relationship between the length and the diameter may vary between about 2 and 4 depending on the wave range to be realized.

The optimum impedance of the feeder to be utilized is one which should be matched with the resistance of the antenna at the point of actuation.

However, by means of a quarter wave line transformer (at the mid-band frequency of the signal to be transmitted) the feeder may be matched with the antenna even though the feeder may have a slightly different impedance than the antenna.

Figure 1:
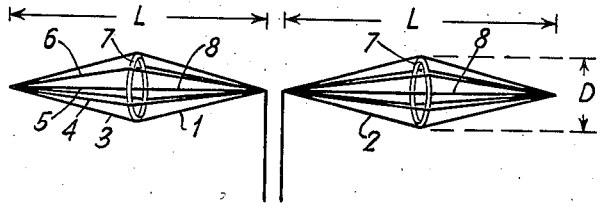
Figure 3:
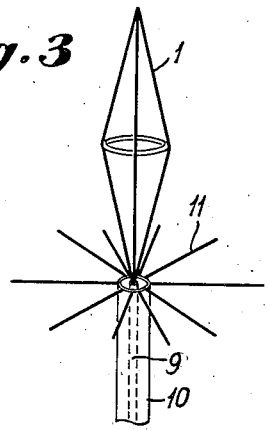
Figure 5:
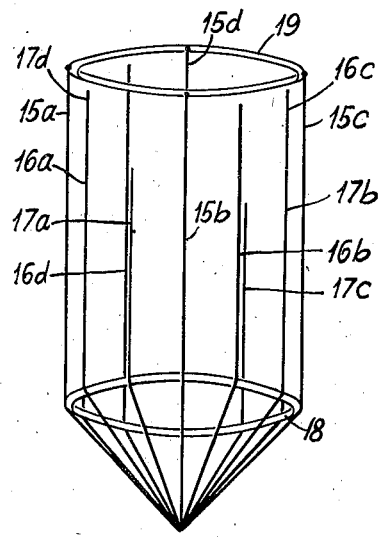
Figure 4:
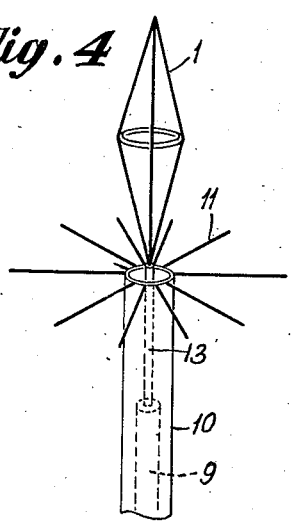
Figure 6:
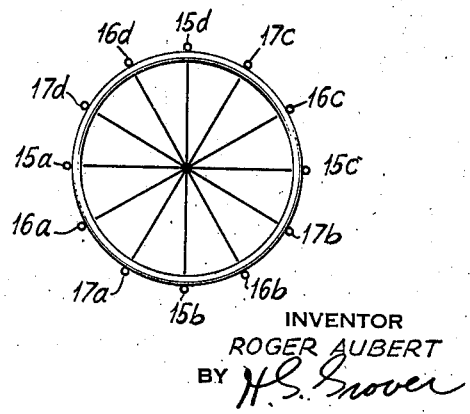

The present invention is delineated in the accompanying drawing in which Figure 1 illustrates the application of the invention to a horizontal symmetrical antenna; Figure 2, to a vertical symmetrical antenna; Figure 3, to a single radiator, while Figure 4 illustrates a modification of Figure 3 including a matching section at the end of the feeder line and Figures 5 and 6 illustrate a modification of the invention.

Figure 1 shows, by way of example, the construction of a symmetrical antenna covering, for example, the range from 3.5 meters to 5.5 meters. The antenna is formed by two identical prisms 1 and 2 which are constituted as such by two joined cones. These cones are formed by metal wires 3, 4, 5, 6, etc. . . . tensioned between two fixed points and across a hoop 7 which may be of metal or an insulator.

Furthermore, the antennas may be held without inconvenience by two supports 8 of metal of of insulating material. Experience shows that the currents will be distributed practically in the exterior wires. The spindle-like shape is useful from the point of view of mechanical stability as well as from the electrical point of view since it permits of giving the wires a maximum separation in the region in which the current is a maximum.

The dimensions L and D are respectively 2 meters and 0.75 meter. The impedance at the point of action is then several hundred ohms which is of advantage when using a bifilar feeder.

This arrangement can be easily provided for the horizontal polarization, the feeder being then vertically mounted and does not react upon the antenna. This, on the contrary, presents a directive effect.

If the antenna is vertically mounted to eliminate this effect, the feeder should then be led off horizontally or at a small angle towards the horizontal which causes difficulty in providing the feeding. If the feeder were to be led off vertically in the proximity of the antenna (Figure 2) it would react according to the frequency upon the pattern of the radiation diagram, thus destroying its circular symmetry.

Under these conditions, it is of advantage to utilize the system shown in Figure 3 wherein the antenna is mounted at the upper extremity of any metallic support (pylon, mast, etc. . . .). This antenna comprises a radiating spindle like a filiform part 1 which is identical as regards dimensions with one of the spindles of Figure 1.

This active system is connected to the inner conductor 9 of a coaxial feeder whose exterior tube 10 normally rising from the ground, is terminated by an artificial ground composed of regularly distributed metallic radiating arms 11.

The lengths of these arms is not critical. It may be chosen in the neighborhood of ¼ of the average wave length.

These arms may even be inclined towards the horizontal at an angle up to about 50 or 60 degrees.

In order to reduce the parasitic radiation of the feeder of the above described arrangement it was found to be of advantage to utilize an active system near the half wave (such as that above described) rather than a system near the quarter wave.

This arrangement permits of obtaining an absolutely circular radiation diagram and of supporting the antenna by a mechanically stable system.

The impedance at the point of action is in the order of a hundred ohms.

The antenna can thus be operated correctly from a feeder of a correctly dimensioned coaxial type.

However, a matching with a feeder of different impedance can be provided when utilizing at the bottom of the antenna between the feeding point and the feeder a line whose length is equal to ¼ of the average wave length, as represented in Figure 4 by the conductor section 13 which performs the service of an impedance transformer according to a known practice. This feeder is closed at both extremities by impedances slightly different from its characteristic impedance and thus provides a valuable practical matching for the entire range.

The range of operation of the antennas may further be extended by resorting to the means shown in Figures 5 and 6.

The antenna is formed by three or four elementary antennas excited in parallel and each having parts of different lengths, namely 15a—15d, 16a—16d, 17a—17d. Certain conductors have been omitted from Figure 5 to avoid confusion.

The parts of each antenna numbering four, for instance, are regularly distributed in a circle such that a substantially circular radiation will be retained. The parts of each antenna are sandwiched between the others as shown in Figure 6.

The supports 18 and 19 should then be insulated.

The spindle like form is here no longer of advantage and that of Figure 5 will be preferable The various parts are tensioned by means of insulators.

The covered wave range may then exceed the proportion 1 to 2.

I claim:

1. A short wave broad band antenna comprising a single vertical radiating element constituted by a plurality of conductors arranged to conform with elements of two conical surfaces having a common base, a concentric conductor feeder line having its central conductor connected to the lower end of said radiating element and an artificial ground connected to the end of the outer conductor of said feeder line, said ground comprising a plurality of radially arranged conductors each having a length equal to one-quarter of the length of a predetermined operating wave.

2. A short wave broad band antenna comprising a plurality of conductors arranged as elements of the surface of a vertical cylinder, said conductors being of different lengths varying between one-half of the length of the shortest operating wave and one-half of the length of the longest operating wave, the diameter of said cylinder being of the order of the average length of said conductors.

3. A short wave broad band antenna comprising a plurality of groups of conductors arranged as elements of the surface of a vertical cylinder, the length of each group of conductors being different and varying between one-half of the length of the shortest operating wave and one-half of the length of the longest operating wave, the diameter of said cylinder being of the order of the average length of said conductors, said conductors being connected together at their lower ends and connected to a feeder line, the conductors of each group being interposed between those of the other groups whereby a substantially circular radiation in the horizontal plane is obtained.

4. The radiator combination comprising an antenna for short waves, for a wide pass band, of the half-wave type, fed at one end thereof, said antenna comprising a plurality of individual conductors lying along a surface of revolution, the ratio of the length to maximum diameter of said surface lying between 2:1 and 4:1, and a radio frequency feeder for connection between the said antenna and apparatus in cooperative relationship therewith, the lengths of the individual conductors of the antenna being different and chosen in a way so that tuning exists in respect to several wavelengths of the said wave band.

5. An antenna array comprising a plurality of groups of parallel conductors, each conductor constituting an element of a cylindrical surface, the conductors of one group being of an optimum length for radiation of ultra short waves near one end of a given frequency band, the conductors of another group being of an optimum length for radiation of waves near the other end of said band, and conductors of another group being of an optimum length for radiation of average waves within said band, said conductors being continued beyond said cylindrical surfaces and forming elements of a conical surface at the apex of which they are interconnected.

ROGER AUBERT.